United States Patent [19]

Tucker

[11] 4,018,941
[45] Apr. 19, 1977

[54] PROCESS FOR COATING POLYMERIC SUBSTRATES WITH MAR-RESISTANT COATING

[75] Inventor: Robert Jerome Tucker, Hackettstown, N.J.

[73] Assignee: American Cyanamid Company, Stamford, Conn.

[22] Filed: May 18, 1976

[21] Appl. No.: 687,576

[52] U.S. Cl. .............................. 427/55; 260/45.8 R; 260/45.95 L; 260/856; 260/849; 427/385 B; 427/430 R; 428/412; 428/425
[51] Int. Cl.² ...................... B05D 3/06; C08K 5/13
[58] Field of Search .......... 260/849, 45.95, 45.8 R, 260/856, 45.9 R; 427/55, 372 R, 384, 385 B, 430 R; 428/412, 425

[56] References Cited

UNITED STATES PATENTS

| | | | |
|---|---|---|---|
| 3,384,606 | 5/1968 | Dieterich et al. | 260/849 |
| 3,542,718 | 11/1970 | Davis et al. | 260/849 |
| 3,626,023 | 12/1971 | Brizgys | 260/849 |
| 3,759,873 | 9/1973 | Hudak | 260/849 |
| 3,785,861 | 1/1974 | Tanimura et al. | 260/849 |
| 3,804,810 | 4/1974 | Fryd | 260/849 |
| 3,862,261 | 1/1975 | Stoddard | 260/849 |
| 3,899,611 | 8/1975 | Hall | 427/54 |
| 3,912,790 | 10/1975 | Chang et al. | 260/849 |
| 3,935,163 | 1/1976 | Spivack et al. | 260/45.95 |

*Primary Examiner*—John H. Newsome
*Attorney, Agent, or Firm*—Frank M. Van Riet

[57] ABSTRACT

Polymeric substrates, especially polycarbonates, are coated with a specific class of mar-resistant coatings under specialized conditions of time and temperature.

10 Claims, No Drawings

PROCESS FOR COATING POLYMERIC SUBSTRATES WITH MAR-RESISTANT COATING

CROSS-REFERENCE TO RELATED APPLICATIONS

This application is related to application Ser. No. 560,417, filed Mar. 20, 1975 and Ser. No. 560,415, filed Mar. 20, 1975 which are basically directed to the mar-resistant coating compositions used in the instant process.

BACKGROUND OF THE INVENTION

The use of polymeric materials for both home and industrial applications has grown rapidly in recent years. One class of polymeric materials, the polycarbonates, has been among those materials showing the most growth. One major application of these polymers which has contributed to their growth has been in the production of high quality, optically clear lenses for such diverse uses as safety glasses, microscopes, binoculars etc. Although the polycarbonates have outstanding properties in general for these applications, such as high optical quality and impact resistance, they are deficient in their resistance to scratching i.e. they are not mar-resistant. This tendency to scratch easily was recognized early and U.S. Pat. No. 3,518,040 suggests a method for coating polycarbonate shaped articles to impart mar-resistance thereto.

SUMMARY

The instant invention is based on the discovery of a process for continuously and uniformly applying a mar-resistant coating to a polymeric substrate and continuously curing the coating to provide uniformly level, cured, mar-resistant articles.

The process provides an effective means for applying a coating of uniform thickness to polymeric substrates and to provide uniformly level, mar-resistant, well-adhered coatings thereon.

DESCRIPTION OF THE INVENTION INCLUDING PREFERRED EMBODIMENTS

As mentioned briefly above, the crux of the instant invention resides in a method for applying a specific class of mar-resistant coatings to polymeric substrates to improve their scratch-resistance. The method is particularly adaptable for the coating of polycarbonate substrates, especially polycarbonate lenses, which may be used in such applications as glazing, safety glasses, display panels and the like.

In accordance with the present invention, a polymeric substrate is continuously contacted, in a clean, dust-free condition, with a coating composition which is produced by reacting one molar portion of a saturated diol having a molecular weight of from about 200 to about 3,000 with two molar portions of a saturated, organic polyisocynate to produce an isocyanate-terminated saturated urethane prepolymer which, in turn, is reacted at a molar ratio of about 1:2, respectively, with a monomeric, sterically bulky, polyhydric alcohol which contains 2–6 hydroxyl groups and which is free of oxyalkylene groups to produce a prepolymer having terminal hydroxy groups. The prepolymer, in turn, is then admixed with a polyalkylether of a polymethylol melamine and an acid catalyst. To this composite mixture may then be added an ultraviolet light absorber.

The prepolymer having terminal hydroxy groups conforms to the general formula:

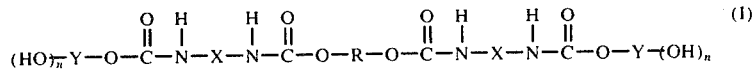

wherein R is the reaction residue of a saturated diol having a molecular weight of 200 – 3,0000, X is the reaction residue of an organic diisocyanate, Y is the reaction residue of a monomeric, sterically bulky, polyhydric alcohol of 4 – 18 carbon atoms containing no oxyalkylene groups, and $n$ is 1 to 5.

The saturated urethane prepolymer having terminal hydroxy groups is produced from diols such as the polyoxyalkylene adducts of diols and alkylene oxides such as ethylene oxide, propylene oxide, butylene oxide and mixtures thereof and the like. The diols useful in preparing these adducts include ethylene glycol, 1,2-propylene glycol, 1,3-propylene glycol, 1,2-butanediol, 1,4-butanediol, 1,6-hexanediol, hydroquinone, bisphenol A, and the like.

Typical polyoxyalkylene diols include polyethyleneether glycol, polypropyleneether glycol, polybutyleneether glycol, polytetramethyleneether glycol, block copolymers, e.g., combinations and polypropyleneether and polyethyleneether glycols; poly-1,2-oxybutylene and polyethyleneether glycols; and poly-1,4-oxybutylene and polyethyleneether glycols; and random copolyether glycols prepared from blends, or sequential addition, of two or more alkylene oxides.

Thus, the polyoxyalkylene diols which can be employed are polyoxylkylene polymers which have an oxygen/carbon atom ratio from about 1:2 and 1:4 and preferably, an oxygen/carbon atom ratio from about 1:2.8 to 1:4 and no more than 2 terminal hydroxyl groups. The polyoxyalkylene diols generally have an average equivalent weight from about 200 to 3,000 and preferably have an average equivalent weight from about 500 to 2,000. Also diol blends such as a mixture of high molecular weight polyoxyalkylene diols can be used in preparing urethane prepolymers having good properties.

Polyoxyalkylene arylene diols which also have molecular weights ranging from about 200 to about 3,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters containing two isocyanate-reactive hydroxyl groups constitute another class of reactive organic diols which may be employed in preparing the urethane prepolymers used in the present invention. While the preparation of polyesters suitable for this purpose has been described in great detail in the prior art and forms no part of the present invention per se, it may be mentioned here by way of illustration that polyesters of this type may be prepared by the condensation of a dihydric alcohol, generally a saturated aliphatic diol such as ethylene glycol, propanediol-1,2 propanediol-1,3, butanediol-1,3,butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic, succinic, glutaric, adipic, pimelic, suberic, azelaic, terephthalic, sebacic, malic, phathalic, cylohexanedicarboxylic and endomethylenetetrahydrophthalic acids, and the like, and their isomers, homologs, and other substituted derivatives, e.g., chloro derivatives. The linear polyesters used in preparing the urethane prepolymers also have molecular weights ranging from about 200 to about 3,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 30 to about 700. When preparing these polyesters, an excess of diol over dicarboxylic acid is generally used.

Nitrogen-containing diols may also be used as diol reactants. Among such materials there are included the polyesteramides conventionally employed in the preparation of urethane prepolymers. i.e., those having molecular weights ranging from about 200 to about 3,000, acid numbers ranging from about 60 as a maximum to as low as can be practicably obtained, e.g., 2 or less, and hydroxyl numbers ranging from about 30 to about 700.

As can be readily appreciated, mixtures of the various reactive organic diols described hereinabove may also be employed in preparing the urethane prepolymers.

The organic diisocyanates which can be employed to produce the urethane prepolymer used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis(cyclohexyl isocyanate), 4-chloro-m-phenylene diisocyanate, isophorone diisocyanate, o, p, or m-phenylenediisocyanate, trimethylhexamethylene diisocyanate, 4-t-butyl-m-phenylenediisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, 3,3'-dimethoxy-4,4'-biphenylene diisocyanate, mixtures thereof and the like.

The diol is completely reacted with the diisocyanate utilizing a molar ratio of about 1:2, respectively, in the presence of a suitable catalyst such as an organotin compound, e.g., dibutyltin dilaurate, dibutyltin octoate and the like; a tertiary amine, e.g., triethylene diamine; and organo lead compound, e.g., lead octoate and the like, at concentrations of from about 0.001% to about 0.1%, by weight, based on the total weight of the diol and diisocyanate. The reaction is allowed to proceed at a temperature of from about 60° C. to about 180° C. until the isocyanate terminated urethane prepolymer forms, i.e., from about 4 to about 24 hours.

The isocyanate-terminated urethane prepolymer is then reacted at a temperature ranging from about 60° C. to about 120° C. for from about ½ – 9 hours, with a monomeric, sterically bulky, polyhydric alcohol containing 2–6 hydroxyl groups but free of oxyalkylene units, in a molar ratio of 1:2 respectively. By 37 monomeric" is meant that these alcohols contain no repeating unit of themselves or other polymeric building blocks such as those exhibited by reaction adducts of glycols with ethylene or propylene oxide. By "sterically bulky" is meant that the steric dimension of the alcohol molecule is greater than simple ethylene glycol or propylene glycol, i.e., it contains at least 4 but no more than 18 carbon atoms. Examples of alcohols which fit this description include 1,4-cyclohexane dimethanol, 1,4-butanediol, mannitol, trimethylol propane, trimethylol ethane, 1,1-cyclohexane dimethanol, hydrogenated bisphenol A, cyclohexane diol, neopentyl glycol, trimethylpentanediol, pentaerythritol, trimethylhexanediol and the like. The result of the second sequential step is the production of a urethane prepolymer having 2–10 terminal hydroxy groups, i.e., 1–5 groups at each end of the prepolymer.

The ultraviolet light absorbers which may be used to produce the compositions used in the present invention may be added thereto in admixture with the urethane prepolymer, the alkylated melamine/formaldehyde material or individually after the prepolymer and melamine/formaldehyde material have been blended. Ultraviolet light compounds which may be employed include 2-[(2-hydroxy-5-t-octylphenyl)] benzotriazole, 2,2'-dihydroxy-4-methoxy-4-methoxy-benzophenone and the like. No ultraviolet light absorber need be used but if one is added, the quantity employed may range from about 1.0 to about 5.0%, by weight, preferably from about 2.5–3.5%, by weight, based on the total weight of the solids in the final composition.

As set forth above, the urethane prepolymer having terminal hydroxy groups is admixed with a polyalkyl ether of a polymethylolmelamine to form the coating composition useful herein. Examples of these melamine materials encompass the dimethyl, diethyl, dipropyl, dibutyl, etc. ethers, the trimethyl, triethyl, tripropyl, tributyl, etc. ethers, the tetramethyl, tetraethyl, tetrapropyl, tetrabutyl, etc. ethers, the pentamethyl pentaethyl, pentapropyl, pentabutyl, etc. ethers, and the hexamethyl, hexaethyl, hexapropyl, hexabutyl, etc. ethers of the dimethylol, trimethylol, tetramethylol, pentamethylol or hexamethylol melamines. Of course, mixed polyalkyl ethers such as the dimethyl, tetraethyl ethers, etc. of the polymethylol melamines may also be used. The preferred melamine is hexakismethoxymethylmelamine. These materials may be produced as set forth in U.S. Pat. No.'s 2,906,724; 2,918,452; 2,998,410; 2,998,411; 3,107,227; 3,422,076, etc. which patents are hereby incorporated herein by reference.

The proportion of polyhydroxy urethane prepolymer to melamine compound should range from about 5:1 to about 1:1, respectively.

From about 1.0% to about 10.0%, by weight, based on the weight of the polyhydroxy urethane prepolymer and the melamine compound, of an acid catalyst is added to the polyhydroxy urethane prepolymer-melamine compound mixture before curing. Para-toluene sulfonic acid is preferred; however, oxylene sulfonic acid, o- and m-toluene sulfonic acids, ethyl acid phosphate, n-butyl phosphoric acid, phosphoric acid, hydrochloric acid and the like can also be used.

In order to render the coating composition useful, it should have a viscosity at normal room temperature i.e. about 22° C., of from about 50 to about 95 centipoises. Where the composition, as produced falls within this viscosity range, it may be used as such. Where the viscosity must be adjusted to fall within the range, it may be diluted with a solvent comprising about a 3:1 to 5:1, mixture, respectively, of n-butanol and the monomethylether of ethylene glycol. The viscosity of the coating composition is critical in that it must be within the above range in order to achieve desirable leveling rate. Other solvents can be employed to adjust the viscosity of the coating composition, but the above solvent mixtures are preferred.

The polymeric materials which may be coated with the above-described coating compositions in accordance with the process of the present invention, in general, include any polymeric material whose surface require mar-resistance improvement, however, the polycarbonates are preferred and, more preferably, polycarbonate resins which have been preformed into the shape of lenses are especially preferred.

The novel coating process of the present invention comprises
A. continuously contacting a clean, dust-free polymeric substrate with the mar-resistant coating at room temperture for from about 2 to about 7 minutes, preferably about 5 minutes,
B. continuously removing the resultant coated substrate from the coating composition,
C. allowing the coating on said substrate to level, with evaporation of solvent, for from about 30 seconds to about 3 minutes, preferably about 1 minute,
D. curing the resultant leveled coating by subjecting it to radiant heat at a temperature of from about 50° C. to about 130° C. for from about 1 minute to about 20 minutes, preferably about 12 minutes.

The contact of the substrate with the coating composition is preferably effected by dipping the substrate in the composition and continuously transporting them through the composition for the required length of time.

The following examples are set forth for purposes of illustration only and are not to be construed as limitations on the present invention except as set forth in the appended claims. All parts and percentages are by weight unless otherwise specified.

EXAMPLE A

PREPARATION OF COATING COMPOSITION 1500 parts of polytetramethyleneether glycol (mol. wt. about 2,000) and 155 parts of polytetramethyleneether glycol (mol. wt. about 620) are disolved in 760 parts of toluene in a suitable reaction vessel and under a blanket of nitrogen. To this mixture is added 520 parts of 1,4-methylene-bis(cyclohexyl isocyanate) and 20 parts of a 1.0% solution of dibutyltin laurate in ethyl acetate. The mixture is heated for 5 hours at 70° C. and 300 parts of cyclohexanonedimethanol are added with stirring. The mixture is then further heated at 70° C. for 1½ hours, 1565 parts of n-butanol are added and the mixture is stirred until homogeneous. The resultant hydroxyl terminated urethane prepolymer has a solids content of 51.4%.

To 480 parts of this prepolymer solution are added 240 parts of hexakis (methoxymethyl) melamine, 133 parts of the monomethylether of ethylene glycol, 450 parts of n-butanol, 14 parts of xylene, 10.36 parts of methanesulfonic acid and 1.0 part of a commercially available leveling agent.

EXAMPLE B

The procedure of Example A is again followed except that 2.43 parts of 2-[(2-hydroxy-5-tert. octylphenyl)] benzotriazole are added to 133 parts of the product of Example A.

EXAMPLE 1

The viscosity of the composition of Example A is adjusted to about 55-65 centipoises at room temperature using a mixture of 4 parts n-butanol and 1 part of the monomethylether of ethylene glycol. The resultant composition is charged to a coating batch and continuously circulated therethrough by means of a sigma pump. The bath is heated to 80° C. and six blank polycarbonate lenses are attached to six clamps on a bar. The bar is attached to a gear train. The lenses are allowed to dip into the agitated coating composition and are continuously held in contact therewith by adjusting the speed of the gear train to provide a dip time of 5 minutes. The lenses are then removed from the coating bath and allowed to level for 1 minute with evaporation of solvent. They are then passed into a heating chamber providing radiant heat at 80° C. for 12 minutes.

The resultant lenses are optically clear and can be subjected to contact with a sharp, hard instrument without evidence of surface scratching. A lens void of the surface coating scratches easily with the same instrument.

EXAMPLE 2

Following the procedure of Example 1, a series of polycarbonate lenses are coated with the composition of Example B. Similar results are achieved.

EXAMPLE 3

When the composition of Example B is modified by replacing the ultraviolet light absorber thereof with 2,2'-dihydroxy-4-methoxybenzophenone and the resultant composition is used to coat polycarbonate lenses in accordance with the procedure of Example 1, results similar to those of Example 1 are achieved.

I claim:
1. A process for coating a polymeric substrate comprising,
A. continuously contacting a clean, dust-free polymeric substrate with a mar-resistant coating composition having a viscosity of from about 50 to about 95 centipoises at room temperature, for from about 2 to about 7 minutes,
B. continuously removing the resultant coated substrate from said coating composition,
C. allowing said coating on said substrate to level, with evaporation of solvent, for from about 30 seconds to about 3 minutes, and
D. curing the resultant leveled coating by subjecting it to radiant heat at a temperature of from about 50° C. to about 130° C. for from about 1 to about 20 minutes, said mar-resistant coating composition consisting essentially of a mixture of (1), (2), (3) and (4), in which

1. is a saturated urethane prepolymer having terminal hydroxy groups which is the reaction product of materials consisting essentially of a mixture of (a) and (b), at a molar ratio of 1:2 respectively in which,
   a. is an isocyanate-terminated urethane which is the reaction product of a mixture consisting essentially of (I) and (II), at a molar ratio of 1:2 respectively in which
      I. is a saturated diol having a molecular weight of from about 200 to about 3,000, and
      II. is a saturated organic isocyanate, (b) is a monomeric, sterically bulky, polyhydric alcohol containing 2–6 hydroxyl groups and being free of oxyalkylene units,
2. is a polyalkyl ether of a polymethylol melamine,
3. is an acid catalyst and
4. is from about 0.0% to about 5.0%, by weight, based on the total weight of solids in said composition, of an ultraviolet light absorber.

2. A process according to claim 1 wherein said step (A) is conducted for about 5 minutes, said step (B) is conducted for about 1 minute and said step (C) is conducted for about 12 minutes at about 80° C.

3. A process according to claim 1 wherein said (I) is a polyalkyleneether glycol.

4. A process according to claim 1 wherein said (II) is 1,4-methylene bis(cyclohexane isocyanate).

5. A process according to claim 1 wherein said (b) is 1,4-cyclohexane dimethanol.

6. A process according to claim 1 wherein said (I) is polytetramethyleneether glycol.

7. A process according to claim 1 wherein said (2) is hexakis(methoxymethyl) melamine.

8. A process according to claim 1 wherein said (4) is about 1.0% to about 5.0%, by weight, same basis, of 2-[(2-hydroxy-5-t-octylphenyl)] benzotriazole.

9. A process according to claim 1 wherein said (4) is about 1.0% to about 5.0% by weight, same basis, of 2,2'-dihydroxy-4-methoxybenzophenone.

10. A process according to claim 1 wherein said polymeric substrate is a polycarbonate.

* * * * *